US012572234B2

(12) United States Patent
Kim et al.

(10) Patent No.: US 12,572,234 B2
(45) Date of Patent: Mar. 10, 2026

(54) DISPLAY DEVICE AND METHOD OF DRIVING THE SAME

(71) Applicant: SAMSUNG DISPLAY CO., LTD., Yongin-si (KR)

(72) Inventors: Soo Won Kim, Yongin-si (KR); Ja Seung Ku, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 288 days.

(21) Appl. No.: 17/806,993

(22) Filed: Jun. 15, 2022

(65) Prior Publication Data

US 2023/0012581 A1 Jan. 19, 2023

(30) Foreign Application Priority Data

Jul. 19, 2021 (KR) ......................... 10-2021-0094440

(51) Int. Cl.
| | |
|---|---|
| *G06F 3/041* | (2006.01) |
| *G06F 3/044* | (2006.01) |
| *G09G 3/00* | (2006.01) |
| *G09G 3/32* | (2016.01) |

(52) U.S. Cl.
CPC ........ *G06F 3/04166* (2019.05); *G06F 3/0446* (2019.05); *G09G 3/035* (2020.08); *G09G 3/32* (2013.01); *G06F 2203/04102* (2013.01); *G09G 2354/00* (2013.01)

(58) Field of Classification Search
CPC ............... G06F 3/04166; G06F 3/0446; G06F 2203/04102; G06F 1/1652; G06F 1/1641;

G06F 1/1616; G06F 2203/04803; G06F 3/04886; G06F 3/044; G06F 2203/04112; G06F 3/0445; G09G 3/035; G09G 3/32;
(Continued)

(56) References Cited

U.S. PATENT DOCUMENTS

| | | | |
|---|---|---|---|
| 10,452,185 B2 | 10/2019 | Kim et al. | |
| 10,871,846 B2 * | 12/2020 | Nishimura | ............ G06F 3/0445 |
| 11,217,135 B2 | 1/2022 | Zhu et al. | |

(Continued)

FOREIGN PATENT DOCUMENTS

| | | |
|---|---|---|
| KR | 10-2015-0076889 A | 7/2015 |
| KR | 10-2019-0030645 A | 3/2019 |
| KR | 10-2174008 | 11/2020 |

*Primary Examiner* — Sujit Shah
(74) *Attorney, Agent, or Firm* — F. CHAU & ASSOCIATES, LLC

(57) ABSTRACT

A display device includes a flexible display panel in which a valid display area viewable to a user is extended or reduced, a touch sensing part overlapping the flexible display panel and including first sensing electrodes and second sensing electrodes intersecting the first sensing electrodes, a touch driver for providing driving signals to the first sensing electrodes, and detecting a touch by using sensing signals supplied from the second sensing electrodes, and a display driver for driving the flexible display panel such that an image is displayed in the valid display area. The touch driver controls at least one of hidden driving signals and hidden sensing signals, which correspond to a hidden display area of the flexible display panel which is not viewable to the user, to be different from at least one of the driving signals and the sensing signals, which correspond to the valid display area.

18 Claims, 13 Drawing Sheets

(58) Field of Classification Search
CPC ........... G09G 2354/00; G09G 2380/02; G09G
2340/04; G09G 3/3208
See application file for complete search history.

(56) References Cited

U.S. PATENT DOCUMENTS

| | | | |
|---|---|---|---|
| 2012/0293455 A1* | 11/2012 | Shen ........................ | G06F 3/047 |
| | | | 345/174 |
| 2014/0098075 A1* | 4/2014 | Kwak ................. | G09G 3/2003 |
| | | | 345/204 |
| 2014/0267145 A1* | 9/2014 | Shepelev .............. | G06F 3/0446 |
| | | | 345/174 |
| 2015/0169123 A1* | 6/2015 | Lee ..................... | G06F 3/04186 |
| | | | 345/174 |
| 2015/0185781 A1 | 7/2015 | Yu et al. | |
| 2017/0031521 A1 | 2/2017 | Drake | |
| 2018/0059829 A1* | 3/2018 | Chen ................... | G06F 3/04184 |
| 2018/0081473 A1* | 3/2018 | Seo ....................... | G06F 1/3287 |
| 2019/0079576 A1* | 3/2019 | Liu ..................... | G06F 3/04166 |
| 2021/0233446 A1* | 7/2021 | Zhu ........................ | G09G 3/035 |
| 2021/0289126 A1* | 9/2021 | Ishii ....................... | H04N 23/63 |
| 2021/0373738 A1* | 12/2021 | Chen ................... | G06F 3/04184 |

* cited by examiner

VDA        HDA

SSE1 SSE2

CMD ⟶ | DISPLAY DRIVER 20 ⊠ GPO | ⟶ PDFS ⟶ | ⊠ GPI TOUCH DRIVER 10 |

FIG. 8

PDFS

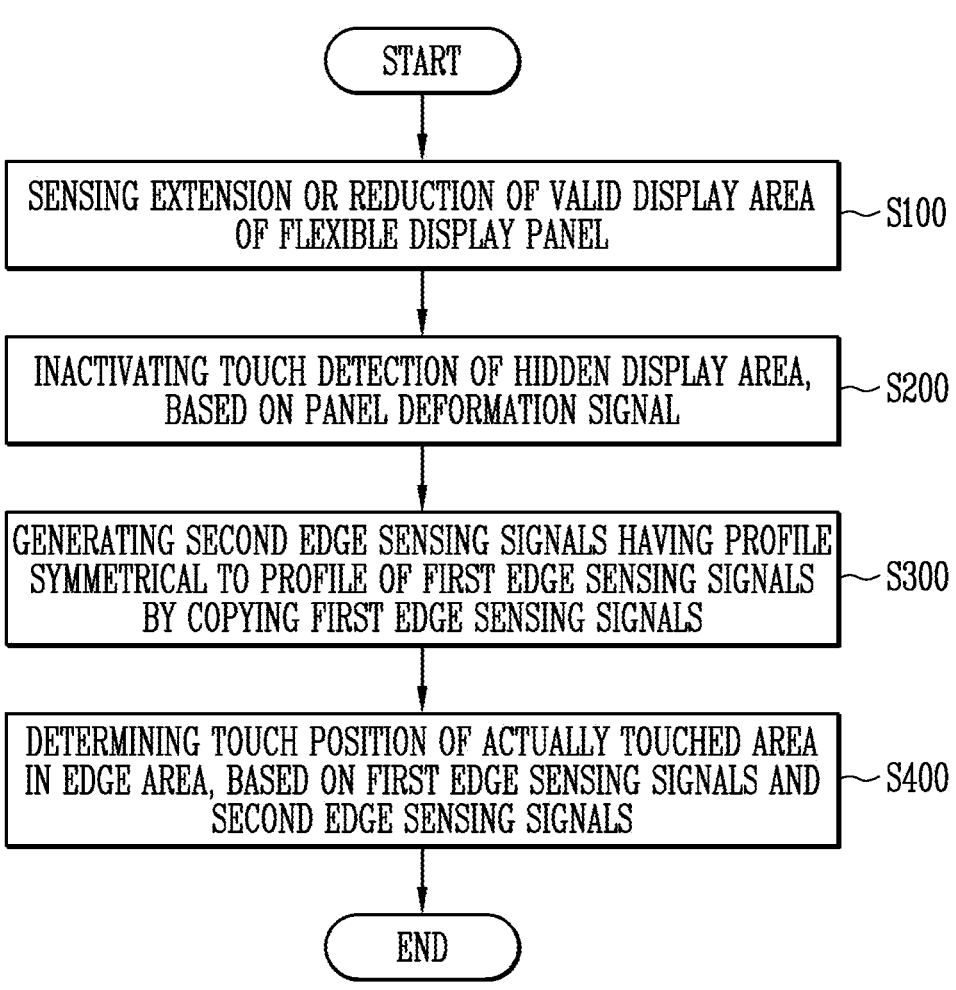

START

SENSING EXTENSION OR REDUCTION OF VALID DISPLAY AREA OF FLEXIBLE DISPLAY PANEL — S100

INACTIVATING TOUCH DETECTION OF HIDDEN DISPLAY AREA, BASED ON PANEL DEFORMATION SIGNAL — S200

GENERATING SECOND EDGE SENSING SIGNALS HAVING PROFILE SYMMETRICAL TO PROFILE OF FIRST EDGE SENSING SIGNALS BY COPYING FIRST EDGE SENSING SIGNALS — S300

DETERMINING TOUCH POSITION OF ACTUALLY TOUCHED AREA IN EDGE AREA, BASED ON FIRST EDGE SENSING SIGNALS AND SECOND EDGE SENSING SIGNALS — S400

END

DISPLAY DEVICE AND METHOD OF DRIVING THE SAME

CROSS-REFERENCE TO RELATED APPLICATIONS

This application claims priority under 35 U.S.C. § 119 to Korean Patent Application No. 10-2021-0094440, filed on Jul. 19, 2021 in the Korean Intellectual Property Office, the disclosure of which is incorporated by reference herein in its entirety.

TECHNICAL FIELD

Embodiments of the present disclosure generally relate to a display device, and more particularly, to a display device including a touch sensor and a method of driving the same.

DISCUSSION OF RELATED ART

A touch sensing part of a touch sensor may be attached to one surface of a display panel for implementing an image display function, or may be integrally formed with the display panel. A user may input information by pressing or touching the touch sensor while viewing an image implemented on the display panel.

The touch sensing part of the touch sensor includes a plurality of electrodes, and determines a touched point by sensing a change in capacitance formed in the plurality of electrodes.

SUMMARY

Embodiments provide a display device for controlling touch driving of a display area which is not viewed by a user to be different from touch driving of a valid display area according to deformation of a flexible display panel.

Embodiments also provide a method of driving the display device.

In accordance with an aspect of the present disclosure, there is provided a display device including: a flexible display panel in which a valid display area viewable to a user is extended or reduced; a touch sensing part overlapping the flexible display panel, the touch sensing part including first sensing electrodes and second sensing electrodes intersecting the first sensing electrodes; a touch driver configured to provide driving signals to the first sensing electrodes, and detect a touch by using sensing signals supplied from the second sensing electrodes; and a display driver configured to drive the flexible display panel such that an image is displayed in the valid display area. The touch driver controls at least one of hidden driving signals and hidden sensing signals, which correspond to a hidden display area of the flexible display panel, to be different from at least one of the driving signals and the sensing signals, which correspond to the valid display area. The hidden display area is not viewable to the user.

The touch driver may inactivate touch detection of the hidden display area.

The touch driver may include: a touch processor configured to detect a touch through signal processing on the sensing signals; and a partial driving controller configured to suspend supply of the hidden driving signals or control driving of the touch processor with respect to the hidden sensing signals, based on a panel deformation signal indicating the hidden display area.

The hidden driving signals may be supplied as a constant voltage.

Supply of the hidden sensing signals may be suspended by the suspension of the supply of the hidden driving signals.

The touch processor may include: a signal processor configured to copy first edge sensing signals corresponding to an edge area of the valid display area to generate second edge sensing signals symmetrical to a profile of the first edge sensing signals; and a touch position determiner configured to determine a touch position by calculating a center of gravity of an actually touched area, based on the first and second edge sensing signals.

The edge region may be adjacent to the hidden display area.

The partial driving controller may activate touch detection of a compensation area as a portion of the hidden display area adjacent to the edge area of the valid display area, and inactivate touch detection of the other area of the hidden display area.

The touch processor may include: an analog-digital converter configured to convert the sensing signals of the valid display area and the hidden sensing signals of the compensation area into digital sensing data; and a touch position determiner configured to determine a touch position by calculating a center of gravity of a touched area, based on the digital sensing data.

The touch processor may further include a signal processor configured to block digital conversion or signal processing on the hidden sensing signals corresponding to the other area of the hidden display area, based on the panel deformation signal.

When the touched area overlaps the edge area, a profile of the digital sensing data corresponding to the edge area and the compensation area may have a shape similar to a Gaussian distribution.

The compensation area may be an area corresponding to a channel for the first sensing electrodes or an area corresponding to a channel for the second sensing electrodes.

A voltage level of the panel deformation signal may be changed corresponding to a change in size of the hidden display area due to deformation of the flexible display panel.

The display driver may include an output pin for outputting the panel deformation signal, and the touch driver may include an input pin for receiving the panel deformation signal from the display driver.

The touch driver may receive a command corresponding to the panel deformation signal through an interface with an external host, and change the voltage level of the panel deformation signal, based on the command.

The touch sensing part may be deformed according to deformation of the flexible display panel.

In accordance with an aspect of the present disclosure, there is provided a method of driving a display device, the method including: sensing extension or reduction of a valid display area of a flexible display panel; inactivating touch detection of at least a portion of a hidden display area of the flexible display panel, based on a panel deformation signal indicating the hidden display area; generating second edge sensing signals symmetrical to a profile of first edge sensing signals corresponding to an edge area of the valid display area by copying the first edge sensing signals; and determining a touch position of an actually touched area in the edge area, based on the first edge sensing signals and the second edge sensing signals.

In the inactivating of the at least a portion of the hidden display area, supply of driving signals corresponding to the hidden display area may be suspended.

In the inactivating of the at least a portion of the hidden display area, signal processing on sensing signals corresponding to the hidden display area may be suspended.

A voltage level of the panel deformation signal may be changed corresponding to a change in size of the hidden display area due to deformation of the flexible display panel.

In the display device and a method of driving the same in accordance with the present disclosure, touch detection on a variable hidden display area is inactivated, so that power consumption can be reduced. Further, first edge sensing signals of an edge area may be copied such that a profile of the first edge sensing signals is symmetrical to a profile of signals with respect to a boundary line, or touch detection of a compensation area as a portion of the hidden display area may be activated. Thus, the accuracy of detection of a touch position formed in the edge area may be improved without any additional power consumption for touch position offset application, etc.

BRIEF DESCRIPTION OF THE DRAWINGS

The above and other features of the present disclosure will become more apparent by describing in detail example embodiments thereof with reference to the accompanying drawings, in which:

FIG. 6 is a view illustrating an example of the touch sensing part included in the display device shown in FIG. 4.

FIG. 7 is a view illustrating an example of a display driver and a touch driver, which are included in the display device shown in FIG. 1.

FIG. 8 is a view illustrating an example of a panel deformation signal for controlling an operation of the touch driver shown in FIG. 1.

FIG. 16 is a flowchart illustrating a method of driving a display device in accordance with embodiments of the present disclosure.

DETAILED DESCRIPTION

Figure 1:
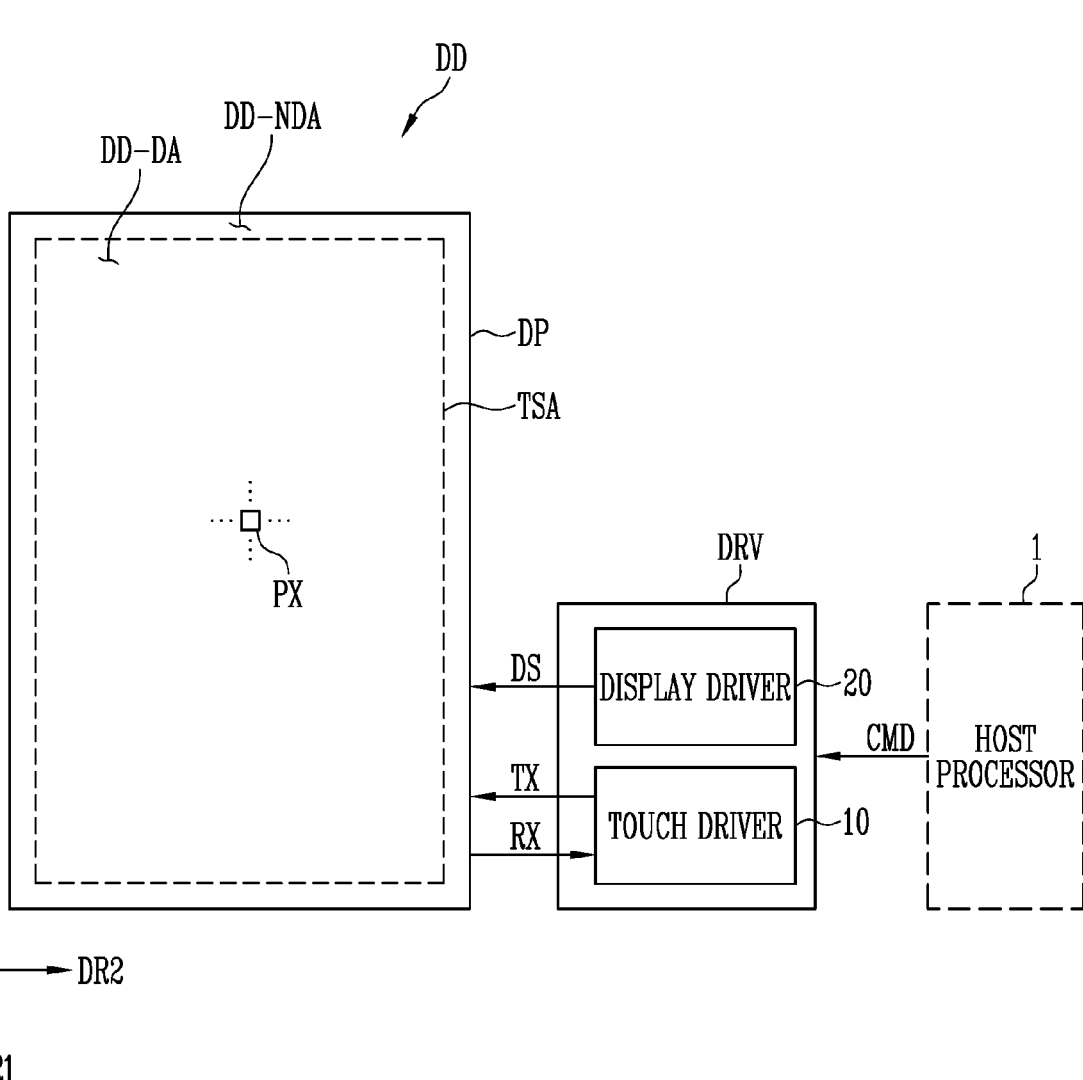
FIG. 1 is a block diagram illustrating a display device in accordance with embodiments of the present disclosure.

Example embodiments of the present disclosure will be described more fully hereinafter with reference to the accompanying drawings. Like reference numerals may refer to like elements throughout the accompanying drawings.

FIG. 1 is a block diagram illustrating a display device in accordance with embodiments of the present disclosure.

Referring to FIG. 1, a display device DD may include a flexible display panel DP, a touch sensing part TSA (or touch sensing area), and driver DRV. The driver DRV may include a display driver 20 and a touch driver 10.

In an embodiment, a display surface of the flexible display panel DP may be substantially parallel to a surface defined by a first direction DR1 and a second direction DR2.

In an embodiment, the display device DD may be a flexible display device. For example, the display device DD may be applied to a foldable display device, a bendable display device, a rollable display device, a stretchable display device, a slidable display device, etc.

The display device DD may be applied to a smartphone terminal. However, this is merely illustrative, and the display device DD is not limited thereto. For example, in embodiments, the display device DD may be applied to large electronic devices such as a television, a monitor, and an electric signboard, and also to small and medium electronic devices such as a tablet, a navigation system, a game console, and a smart watch. The display device DD may also be applied to wearable electronic devices such as, for example, a head-mounted display.

In the flexible display panel DP, a valid display area viewable by a user may be extended or reduced. The flexible display panel DP has properties including, for example, bendability, rollability, stretchability, slidability, etc., and may be freely deformed.

The display surface of the flexible display panel DP may include a display area DD-DA in which an image is displayed and a non-display area DD-NDA adjacent to the display area DD-DA in which an image is not displayed.

Pixels PX may be provided in the display area DD-DA and may be used to display the image. The non-display area DD-NDA is an area in which the pixels PX are not disposed and in which the image is not displayed. The non-display area DD-NDA may be disposed outside of the display area DD-DA. In embodiments, the non-display area DD-NDA may surround the display area DD-DA.

In an embodiment, the display area DD-DA may include the touch sensing part TSA. The touch sensing part TSA may be implemented by a touch sensor. The touch sensor may be referred to as including the touch sensing part TSA and the touch driver 10.

The touch sensing part TSA may be disposed corresponding to the display area DD-DA.

In an embodiment, the driver DRV may receive a command CMD from a host processor 1 such as, for example, an external graphic source. The command CMD may include various commands associated with image display and/or touch detection control. The host processor 1 and the driver DRV may transmit/receive information through various types of interfaces.

In an embodiment, the display driver 20 and the touch driver 10 may be disposed on a printed circuit board. However, this is merely illustrative, and embodiments are not limited thereto. For example, in embodiments, a configuration having a function of at least a portion of the display driver 20 and the touch driver 10 may be directly disposed on the flexible display panel DP.

The display driver 20 may drive the flexible display panel DP. For example, the display driver 20 may output, to the flexible display panel DP, a data signal DS corresponding to image data.

The touch driver 10 may drive the touch sensing part TSA. The touch driver 10 may provide driving signals TX to the touch sensing part TSA, and determine a touch position by detecting a capacitance change in the touch sensing part TSA from sensing signals received from the touch sensing part TSA. The touch driver 10 may receive sensing signals RX from the display device DD.

In an embodiment, the touch driver 10 may control at least one of driving signals (e.g., hidden driving signals) and sensing signals (e.g., hidden sensing signals), which correspond to a hidden display area of the flexible display panel DP, to be different from driving signals and sensing signals which correspond to the valid display area. For example, the touch driver 10 may inactivate touch detection of the hidden display area. For example, the touch driver 10 may control hidden driving and hidden sensing signals corresponding to a hidden display area of the flexible display panel DP differently from non-hidden driving and non-hidden sensing signals corresponding to the valid display area of the flexible display panel DP.

In an embodiment, information and a command, which are associated with deformation of the display device DD including the flexible display panel DP, may be included in the command CMD transferred to the touch driver 10. For example, the touch driver 10 may perform touch detection driving of the valid display area and touch detection driving of the hidden display area, which are different from each other, based on the command CMD.

In an embodiment, the touch driver 10 and the display driver 20 may be implemented as driving circuit chips that are separate from each other. However, this is merely illustrative, and embodiments are not limited thereto. For example, in embodiments, at least some functions of the touch driver 10 and the display driver 20 may be integrated in one driving circuit chip.

Figure 2A:
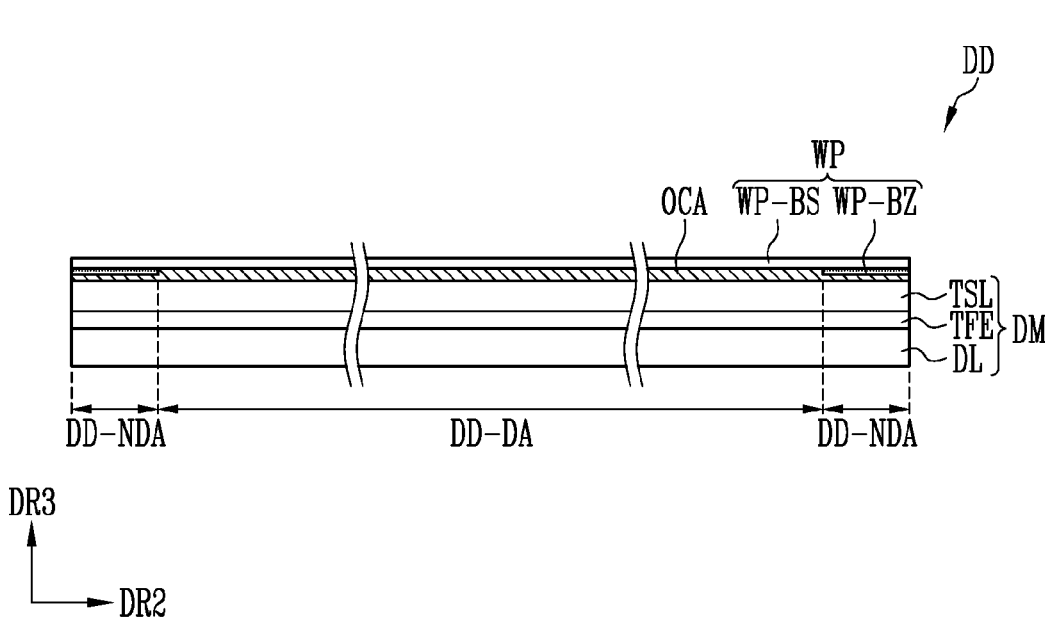
FIGS. 2A and 2B are cross-sectional views schematically illustrating examples of the display device shown in FIG. 1.
Figure 2B:
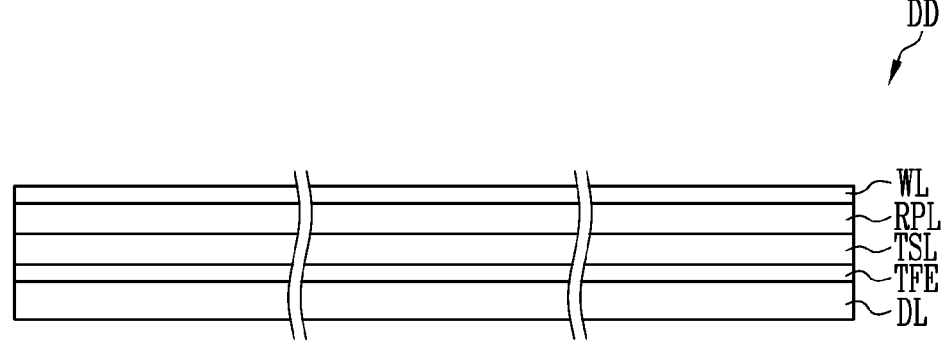
Figure 2B:

FIGS. 2A and 2B are cross-sectional views schematically illustrating examples of the display device shown in FIG. 1.

In FIGS. 2A and 2B, a stacked relationship of functional panels and/or functional members, which constitute the display device DD, is illustrated.

Referring to FIGS. 1, 2A, and 2B, the display device may include a display element layer DL, an encapsulation layer TFE, a touch sensor layer TSL, and a window unit WP or WL.

In an embodiment, a normal direction of the display surface, e.g., a thickness direction of the display device DD, may be a third direction DR3.

In an embodiment, the display element layer DL, the encapsulation layer TFE, and the touch sensor layer TSL may be formed through a continuous process. The window unit WP or WL may be coupled to a component at a back surface thereof through an adhesive member. The adhesive member may include, for example, an ordinary adhesive or glue. The adhesive member shown in FIG. 2A may be, for example, an optically clear adhesive member OCA.

In an embodiment, the touch sensor layer TSL may sense a contact or input caused by an external medium such as, for example, a hand or pen, to the display surface of the display device DD. The touch sensor layer TSL may be a component of the touch sensing part TSA except the touch driver 10.

In an embodiment, the encapsulation layer TFE and the display element layer DL may be defined as the flexible display panel (DP shown in FIG. 1). The display element layer DL may include, for example, a light emitting element, transistors for driving the light emitting element, and signal lines.

The encapsulation layer TFE may be disposed directly on the display element layer DL. In this specification, "component B is directly disposed on component A" means that any separate adhesive layer/adhesive member is not disposed between the component A and the component B. The component B may be formed through a continuous process after the component A is formed.

In an embodiment, the touch sensor layer TSL may be disposed directly on the encapsulation layer TFE. The display element layer DL, the encapsulation layer TFE, and the touch sensor layer TSL may be defined as a display module DM.

In the window unit WP or WL shown in FIG. 2A or 2B, a corresponding component formed with another component through a continuous process is expressed as a "layer." A component coupled to another component through an adhesive member is expressed as a "panel." For example, the window unit WP or WL may be designated as a window panel WP or a window layer WL according to whether a base layer exists.

In an embodiment, as shown in FIG. 2A, an optically clear adhesive member OCA may be disposed between the display module DM and the window panel WP. For example, the optically clear adhesive member OCA may be disposed between the display panel DM and the window panel WP to adhere the display panel DM and the window panel WP to each other.

In an embodiment, the display module DM may be a light emitting display module. However, embodiments are not limited thereto. For example, in embodiments, the display module DM may be an organic light emitting display module or a light emitting display module which exhibits a color through a quantum dot.

In an embodiment, the window panel WP may include a base film WP-BS and a light blocking pattern WP-BZ. The base film WP-BS may include a glass substrate and/or a synthetic resin film. The base film WP-BS is not limited to a single layer. The base-film WP-BS may include two or more films coupled to each other through an adhesive member.

The light blocking pattern WP-BZ partially overlaps the base film WP-BS. The light blocking pattern WP-BZ may be disposed on a back surface of the base film WP-BS to define a bezel area, e.g., the non-display area DD-NDA of the display device DD.

In an embodiment, the window panel WP may further include a functional coating layer disposed on a top surface and/or a bottom surface of the base film WP-BS. The functional coating layer may include, for example, an anti-fingerprint layer, an anti-reflection layer, a hard coating layer, etc.

In an embodiment, an additional anti-reflection member may be further provided between the touch sensor layer TSL and the optically transparent adhesive member OCA. The anti-reflection member decreases the reflexibility of external light incident from the top of the window panel WP.

In an embodiment, as shown in FIG. 2B, the display device DD may include a display element layer DL, an encapsulation layer TFE, a touch sensor layer TSL, an anti-reflection layer RPL, and a window layer WL. Adhesive members may be omitted from the display device DD, and the touch sensor layer TSL, the anti-reflection layer RPL, and the window layer WL may be formed on a base layer provided by the encapsulation layer TFE through a continuous process. A stacked order of the touch sensor layer TSL and the anti-reflection layer may be changed.

The anti-reflection layer RPL decreases the reflexibility of external light incident from the top of the window layer WL. In an embodiment, the anti-reflection layer RPL may include a retarder and a polarizer. The retarder may be of a film type or a liquid crystal coating type, and include a λ/2 retarder and/or a λ/4 retarder. The polarizer may also be of a film type or a liquid crystal coating type.

In an embodiment, the anti-reflection layer RPL may include color filters. The color filters have a predetermined arrangement. The arrangement of the color filters may be determined by considering light emitting colors of pixels included in the display element layer DL. The anti-reflection layer RPL may further include a black matrix adjacent to the color filters.

Figure 3A:
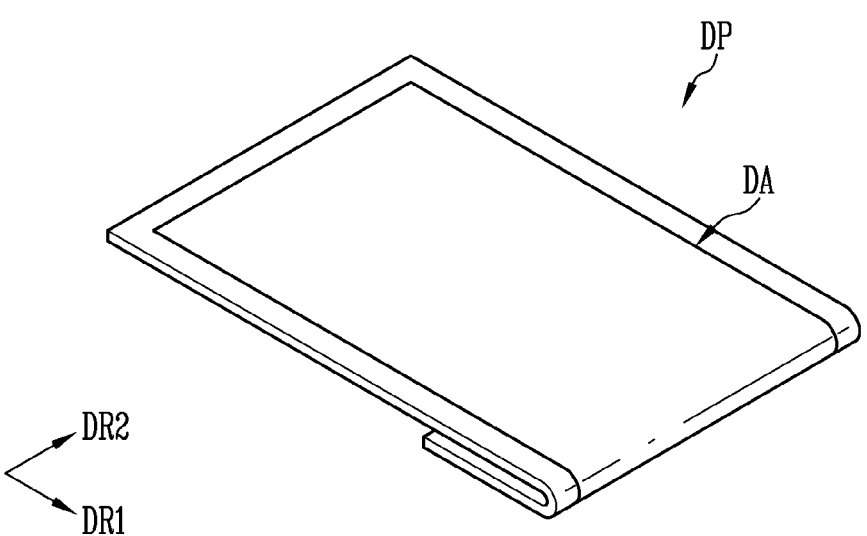
FIGS. 3A to 3C are views illustrating examples of a flexible display panel included in the display device shown in FIG. 1.
Figure 3B:
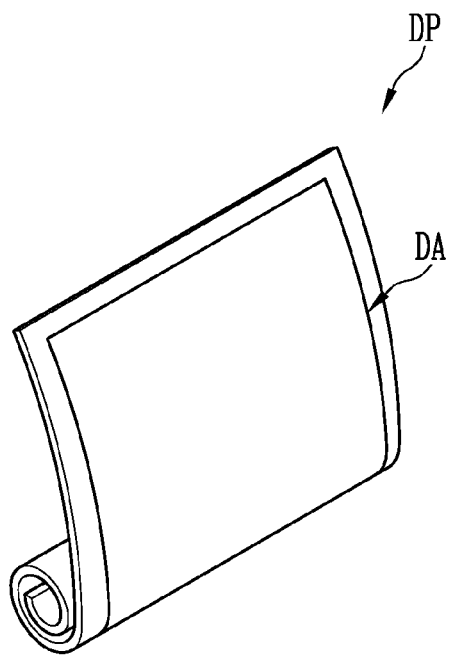
Figure 3C:
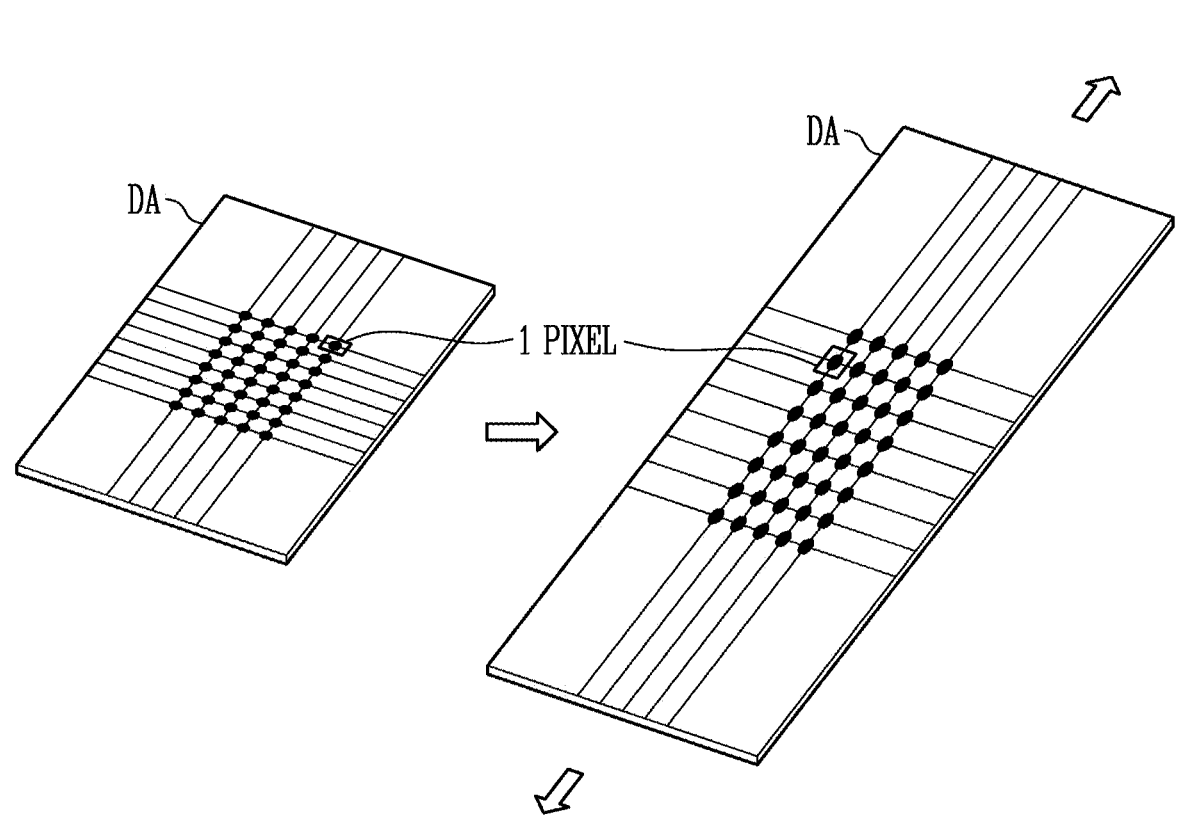

FIGS. 3A to 3C are views illustrating examples of the flexible display panel included in the display device shown in FIG. 1.

Referring to FIGS. 3A to 3C, the shape and/or size of a display area DA of the flexible display panel DP may be deformed.

In an embodiment, the touch sensing part overlapping the display area DA of the flexible display panel DP may also be changed corresponding to the deformation of the display area DA.

In an embodiment, as shown in FIG. 3A, at least a portion of the flexible display panel DP may be folded or curved. The portion at which the flexible display panel DP is folded or curved and the direction in which the flexible display panel DP is folded or curved may be freely changed. For example, when the folded or curved portion is changed along the first direction DR1, this may be understood as a slidable display panel.

In an embodiment, as shown in FIG. 3B, the flexible display panel DP may be a rollable display panel. In an example, the flexible display panel DP may be rolled such that the display area DA faces an outer side, or be rolled such that the display area DA faces an inner side. That is, at least one area of the flexible display panel DP may be rolled, and the rolling direction is not particularly limited.

In an embodiment, as shown in FIG. 3C, the flexible display panel DP may be a stretchable display panel. That is, the area of pixels of the display area DA (e.g., an emission area of the pixels) may be enlarged or reduced, so that the display area DA is extended or reduced.

However, this is merely illustrative, and the implementation of the flexible display panel DP is not limited thereto.

Figure 4:
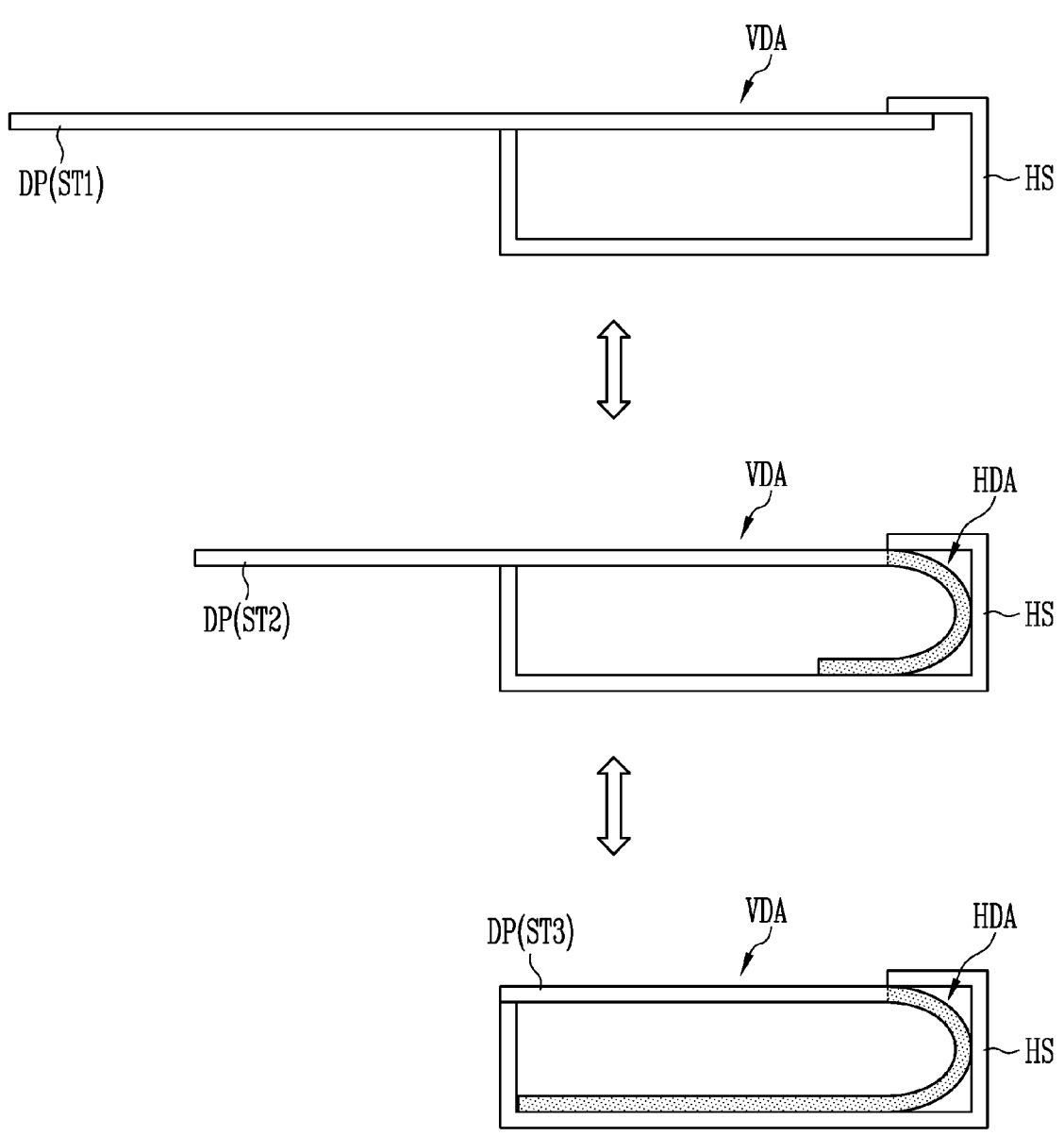
FIG. 4 is a view illustrating an example of a state change of the flexible display panel included in the display device shown in FIG. 1.

FIG. 4 is a view illustrating an example of a state change of the flexible display panel included in the display device shown in FIG. 1.

Referring to FIGS. 1 and 4, the flexible display panel DP may be accommodated in a predetermined housing HS. Also, the flexible display panel DP may be deformed along a space set in the housing HS.

The touch sensing part (TSA shown in FIG. 1) may be deformed along the flexible display panel DP. A valid display area VDA viewed by a user (e.g., an area which is viewable by the user during use) may be extended or reduced by the deformation of the flexible display panel DP, and a hidden display area HDA which is not viewed by the user (e.g., an area which is not viewable by the user during use) may be reduced or extended corresponding to the extension or reduction of the valid display area VDA. For example, the hidden display area HDA may be a portion led into the housing HS.

As shown in FIG. 4, the flexible display panel DP may have various states (e.g., one of first, second, and third states ST1, ST2, and ST3), and accordingly, the area and/or shape of the valid display area VDA may be changed. For example, the valid display area VDA may be maximally unfolded in the first state ST1. The valid display area VDA in the second state ST2 may be smaller than that in the first state ST1, and the valid display area VDA in the third state ST3 may be smaller than that in the second state ST2. However, this is merely illustrative, and a reference for setting the valid display area VDA is not limited thereto.

As shown in FIG. 4, in the second state ST2 and the third state ST3, a user cannot touch or manipulate the hidden display area HDA. Accordingly, a driving method of inactivating touch driving/detection corresponding to the hidden display area HDA may be implemented according to embodiments, which may reduce unnecessary power consumption.

Figure 5:
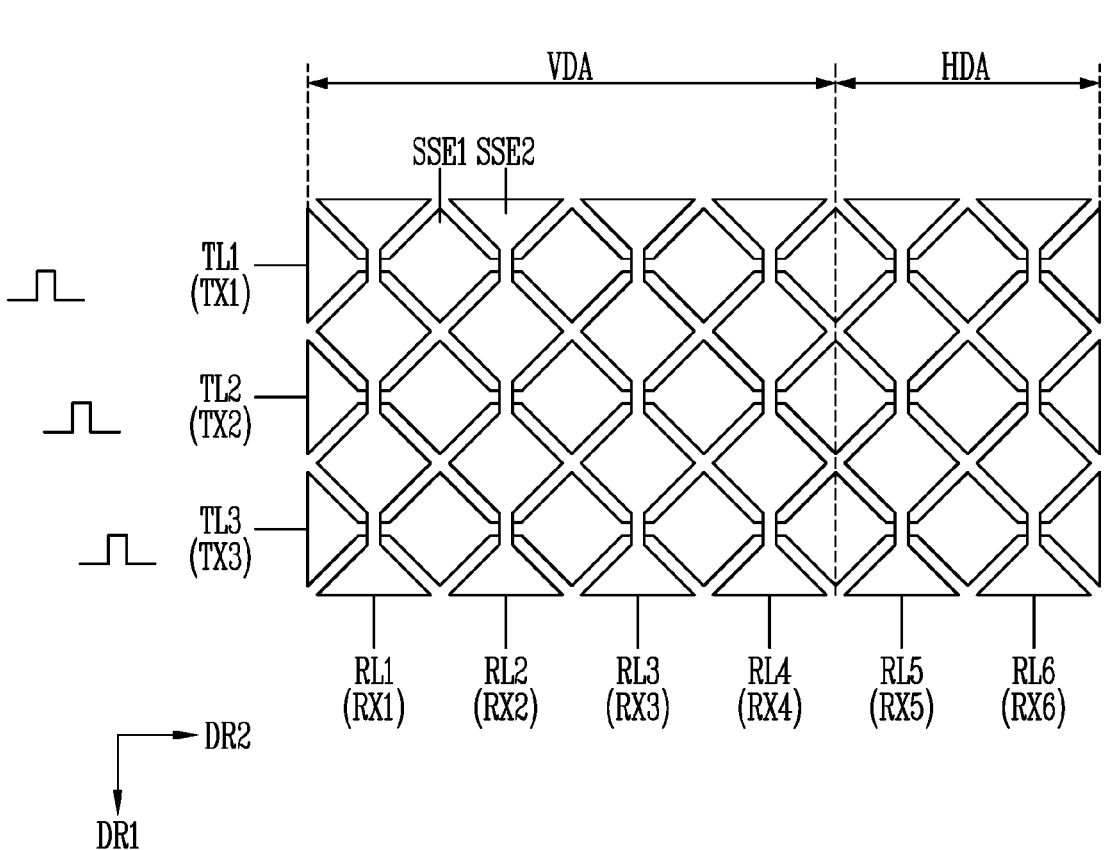
FIG. 5 is a view illustrating an example of a touch sensing part included in the display device shown in FIG. 4.

FIG. 5 is a view illustrating an example of the touch sensing part included in the display device shown in FIG. 4.

Referring to FIGS. 1, 4, and 5, the touch sensing part TSA may include first sensing electrodes SSE1 and second sensing electrodes SSE2.

Each of the first sensing electrodes SSE1 may extend in the second direction DR2, and the first sensing electrodes SSE1 may be repeatedly arranged along the first direction DR1. In an embodiment, the first sensing electrodes SSE1 may be respectively connected to driving lines TL1 to TL3 to which driving signals TX1 to TX3 are transferred. Although a case in which the driving lines TL1 to TL3 are connected to one end of the respective first sensing electrodes SSE1 is illustrated in FIG. 5, the present disclosure is not limited thereto. For example, in embodiments, the driving lines TL1 to TL3 may be connected to both ends of the respective first sensing electrode SSE1.

First to third driving signals TX1 to TX3 may be supplied from the touch driver 10 through first to third driving lines TL1 to TL3. For example, the first to third driving signals TX1 to TX3 having a square wave may be sequentially supplied respectively to the first to third driving lines TL1 to TL3. However, this is merely illustrative, and the waveform and supply order of the first to third driving lines TL1 to TL3 are not limited thereto. For example, according to a touch detection method, the first to third driving signals TX1 to TX3 may be simultaneously supplied or be supplied with various waveforms including, for example, a sinusoidal wave.

The second sensing electrodes SSE2 may intersect the first sensing electrodes SSE1. For example, each of the second sensing electrodes SSE2 may extend in the first direction DR1, and the second sensing electrodes SSE2 may be repeatedly arranged along the second direction DR2. In an embodiment, the second sensing electrodes SSE2 may be respectively connected to sensing lines RL1 to RL6 to which sensing signals RX1 to RX6 are transferred. Although a case in which the sensing lines RL1 to RL6 are connected to one end of the respective second sensing electrodes SSE2 is illustrated in FIG. 5, the present disclosure is not limited thereto. For example, in embodiments, the sensing lines RL1 to RL6 may be connected to both ends of the respective second sensing electrodes SSE2.

First to sixth sensing signals RX1 to RX6 may include a signal change according to a change in capacitance between the first sensing electrodes SSE1 and the second sensing electrodes SSE2. The first to sixth sensing signals RX1 to RX6 may be provided to the touch driver 10, and the touch driver 10 may detect a touch position by performing an operation on the first to sixth sensing signals RX1 to RX6.

Although a case in which each of the first sensing electrodes SSE1 and the second sensing electrodes SSE2 are connected in a rhombic shape is illustrated in FIG. 5, the present disclosure is not limited thereto. For example, in embodiments, the first sensing electrodes SSE1 and the second sensing electrodes SSE2 may have various types of polygonal shapes. In addition, each of the first sensing electrodes SSE1 and the second sensing electrodes SSE2 may be formed in a mesh pattern.

As shown in FIG. 5, the valid display area VDA may be an area including the first to fourth sensing lines RL1 to RL4, and the hidden display area HDA may be an area including the fifth and sixth sensing lines RL5 and RL6. The fifth and sixth sensing signals RX5 and RX6 corresponding to the hidden display area may be referred to as hidden sensing signals. Each of the first to third driving signals TX1 to TX3 may be equally supplied to the valid display area VDA and the hidden display area HDA.

In an embodiment, the touch driver 10 may inactivate touch detection of the hidden display area HDA. In the embodiment shown in FIG. 5, when the touch detection is inactivated, a detection operation on the fifth and sixth sensing signals RX5 and RX6, which are the hidden sensing signals, is not performed (e.g., the detection operation is inactivated). For example, touch position detection through digital processing or capacitance calculation on the fifth and sixth sensing signals RX5 and RX6 provided to the touch driver 10 may be suspended, or transfer of the fifth and sixth sensing signals RX5 and RX6 in the touch driver 10 may be suspended. For example, when touch detection of the hidden display area HDA is inactivated, hidden sensing signals (e.g., RX5 and RX6) which correspond to the hidden display area HDA may be controlled to be different from sensing signals (e.g., RX1 to RX4) which correspond to the valid display area VDA.

Figure 6:
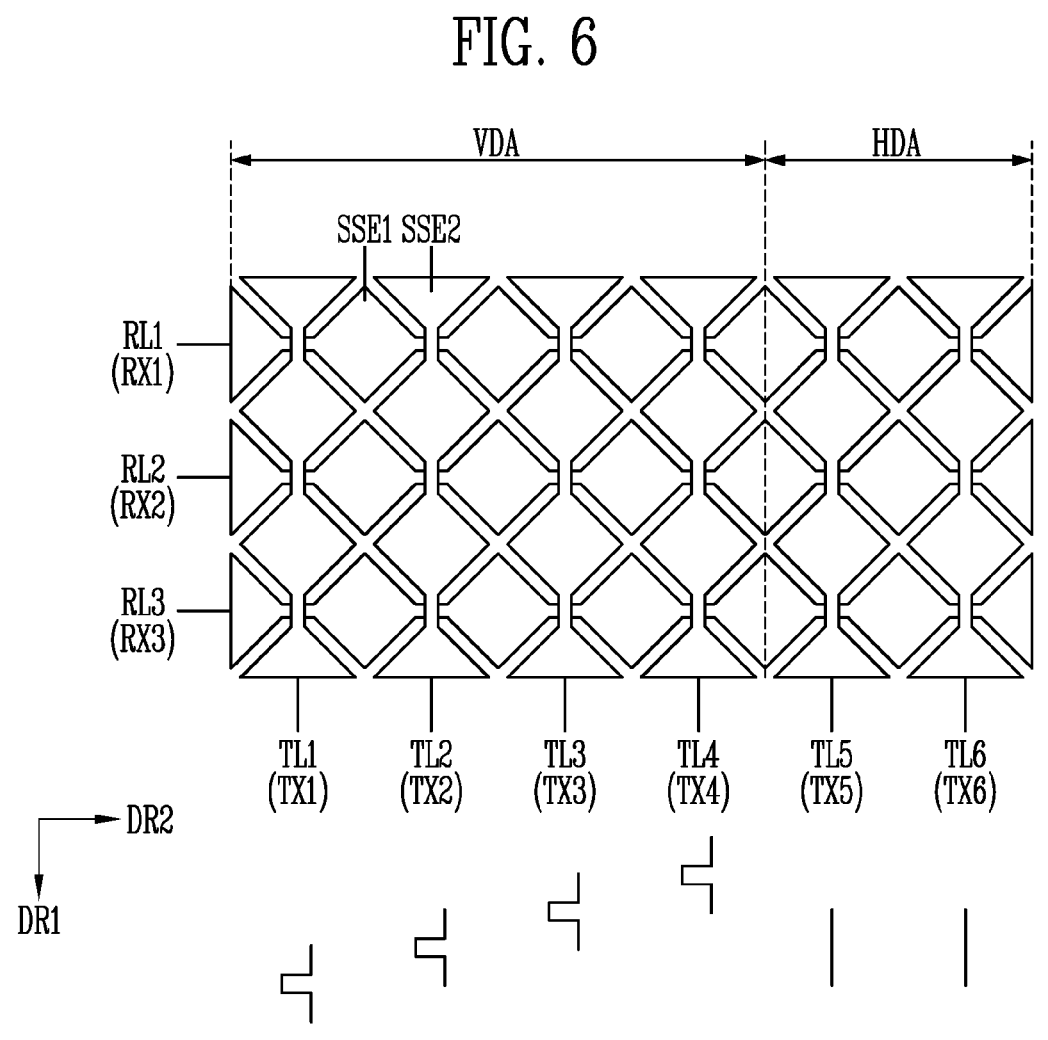

FIG. 6 is a view illustrating an example of the touch sensing part included in the display device shown in FIG. 4.

In FIG. 6, components identical to those described with reference to FIG. 5 are designated by like reference numerals, and a repetitive description thereof will be omitted. In addition, a touch sensing part shown in FIG. 6 may be configured substantially identically or similarly to the touch sensing part shown in FIG. 5, except the positions of driving lines TL1 to TL6 and sensing lines RL1 to RL3.

Referring to FIGS. 1, 4, and 6, the touch sensing part TSA may include first sensing electrodes SSE1 and second sensing electrodes SSE2.

In an embodiment, the first sensing electrodes SSE1 may be respectively connected to sensing lines RL1 to RL3 to which sensing signals RX1 to RX3 are transferred. The second sensing electrodes SSE2 may be respectively connected to driving lines TL1 to TL6 to which driving signals TX1 to TX6 are transferred.

As shown in FIG. 6, the valid display area VDA may include first to fourth driving lines TL1 to TL4, and the hidden display area HDA may include fifth and sixth driving lines TL5 and TL6. Fifth and sixth driving signals TX5 and TX6 corresponding to the hidden display area HDA may be referred to as hidden driving signals.

First to fourth driving signals TX1 to TX4 having a square wave of a sinusoidal wave may be provided to first to fourth driving lines TL1 to TL4. Touch detection on the valid display area VDA may be performed based on first to third sensing signals RX1 to RX3 output through first to third sensing lines RL1 to RL3.

In an embodiment, the touch driver 10 may inactivate touch detection of the hidden display area HDA. In the embodiment shown in FIG. 6, when the supply of the hidden driving signals (e.g., the fifth and sixth driving signals TX5 and TX6 supplied to the fifth and sixth driving lines TL5 and TL6) is suspended, the touch detection on the hidden display area HDA may be inactivated. For example, the fifth and sixth driving lines TL5 and TL6 may be floated, or the fifth and sixth driving signals TX5 and TX6 may be output as a constant voltage.

As described above, the signal input and/or signal output and touch detection on the hidden display area HDA are suspended according to embodiments, thus reducing power consumption.

Figures 7, 8:
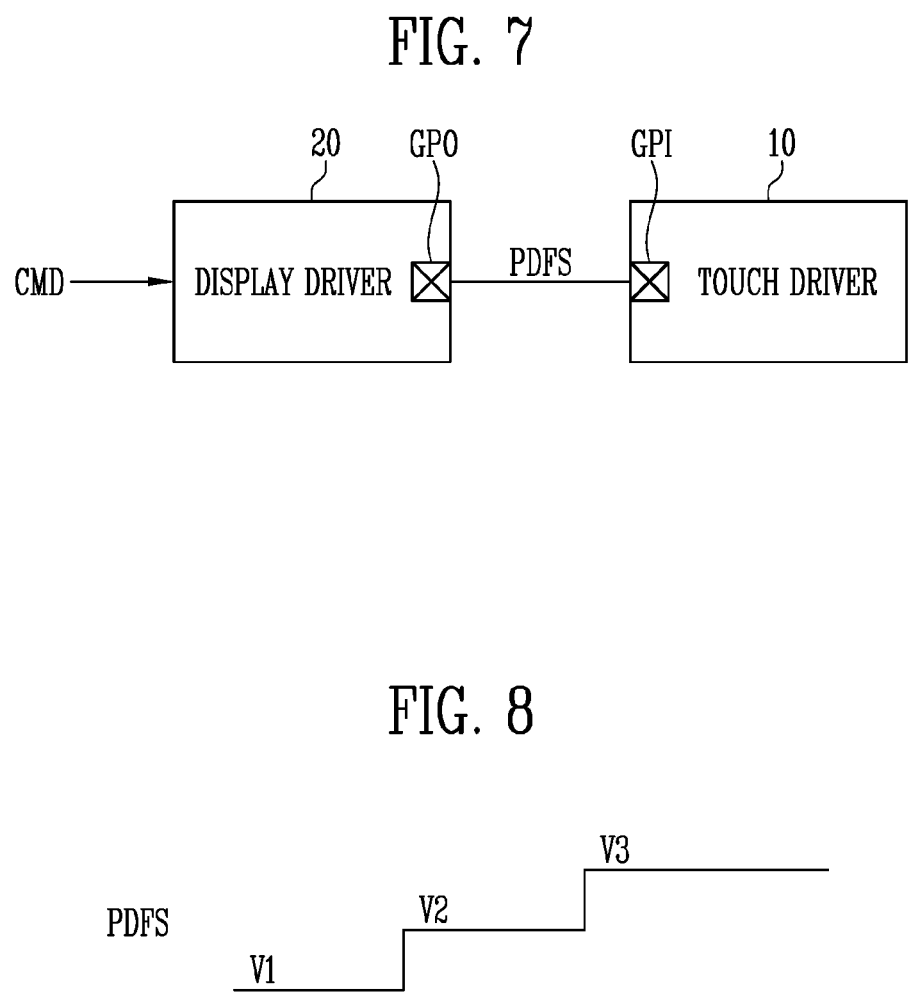

FIG. 7 is a view illustrating an example of the display driver and the touch driver, which are included in the display device shown in FIG. 1.

Referring to FIGS. 1, 4, and 7, the display driver 20 and the touch driver 10 may be electrically connected to each other.

In an embodiment, the display driver 20 may include an output pin GPO for outputting a panel deformation signal PDFS, and the touch driver 10 may include an input pin GPI for receiving the panel deformation signal PDFs. The output pin GPO and the input pin GPI may be connected to each other by a predetermined signal line.

In an embodiment, the display driver 20 may generate the panel deformation signal PDFS, based on a command CMD provided from the host processor 1. For example, the command CMD may include whether a slide-in operation or a slide-out operation has occurred due to deformation of the flexible display panel DP. In the case of the slide-in operation, it may be understood that the hidden display area HDA exists. In the case of the slide-out operation, it may be understood that the hidden display area HDA does not exist.

In the case of the slide-in operation, the panel deformation signal PDFS has a first level, and the touch driver 10 may perform touch detection on the entirety of the touch sensing part TSA. In the case of the slide-out operation, the panel deformation signal PDFS has a second level, and the touch driver 10 may activate touch detection of the valid display area VDA of the touch sensing part TSA and inactivate touch detection of the hidden display area HDA.

However, this is merely illustrative, and the command CMD and the panel deformation signal PDFS may include not only slide-in/slide-out information, but also information on a size change of the hidden display area HDA due to the deformation of the flexible display panel PD.

FIG. 8 is a view illustrating an example of the panel deformation signal for controlling an operation of the touch driver shown in FIG. 1.

Referring to FIGS. 1, 4, 7, and 8, a voltage level of the panel deformation signal PDFS may be changed corresponding to a change in size of the hidden display area HDA due to deformation of the flexible display panel DP.

In an embodiment, the touch driver 10 may adjust an area in which touch detection is inactivated according to the voltage level of the panel deformation signal PDFS. For example, the area in which the touch detection is inactivated may substantially correspond to the hidden display area HDA.

For example, the panel deformation signal PDFS may have a first level V1, corresponding to the first state ST1 of the flexible display panel DP. The touch driver 10 may activate the entirety of the touch sensing part TSA in response to the panel deformation signal PDFS having the first level V1.

The panel deformation signal PDFS may have a second level V2, corresponding to the second state ST2 of the flexible display panel DP. The touch driver 10 may activate touch detection of the valid display area VDA and inactivate touch detection of the hidden display area HDA, in response to the panel deformation signal PDFS having the second level V2.

The panel deformation signal PDFS may have a third level V3, corresponding to the third state ST3 of the flexible display panel DP. The touch driver 10 may activate touch detection of the valid display area VDA and inactivate touch detection of the hidden display area HDA, in response to the panel deformation signal PDFS having the third level V3. A size of the hidden display area HDA inactivated in the third state ST3 may be greater than that of the hidden display area HDA in the second state ST2.

However, this is merely illustrative, and the voltage levels of the panel deformation signal PDFS and relationships between the valid display area VDA and the hidden display area HDA, which correspond thereto, are not limited thereto.

As described above, the area in which touch detection of the touch sensing part TSA is activated may be changed according to various deformation states of the flexible display panel DP. Thus, power consumption for touch detection can be reduced corresponding to deformation of the flexible display panel DP.

Figure 9:
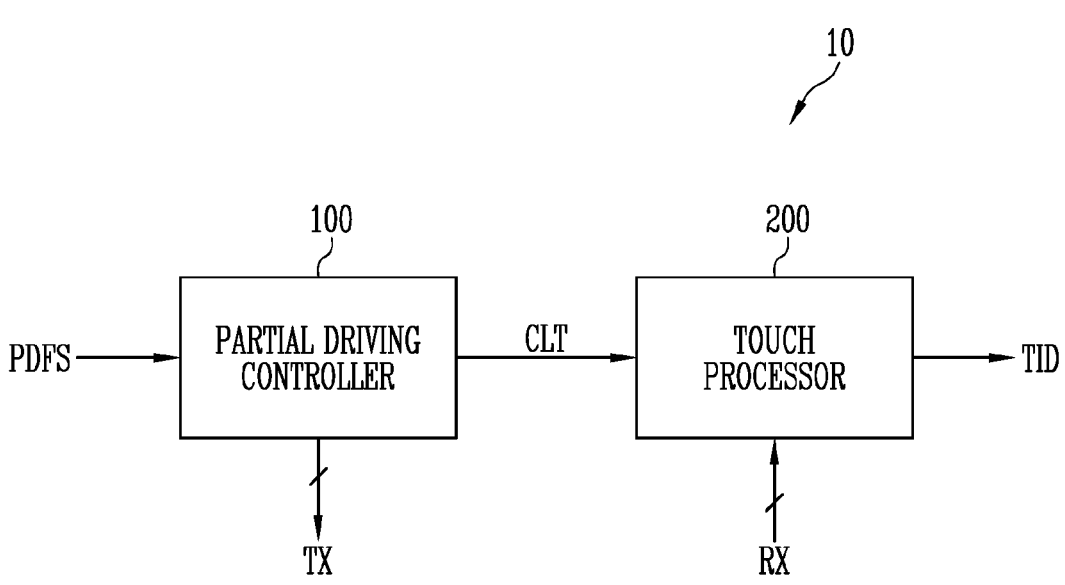
FIG. 9 is a block diagram illustrating an example of the touch driver shown in FIG. 1.

FIG. 9 is a block diagram illustrating an example of the touch driver shown in FIG. 1.

Referring to FIGS. 1, 5, 6, and 9, the touch driver 10 may include a partial driving controller 100 and a touch processor 200.

The partial driving controller 100 may suspend supply of hidden driving signals or control driving of the touch processor 200 with respect to hidden sensing signals, based on the panel deformation signal PDFS. The hidden driving signals may be understood as signals corresponding to the hidden display area HDA among the driving signals TX. The hidden sensing signals may be understood as signals corresponding to the hidden display area HDA among the sensing signals RX.

The partial driving controller 100 may provide the driving signals TX to the driving lines, based on the panel deformation signals PDFS. In an embodiment, as shown in FIG. 6, the partial driving controller 100 may provide driving signals (e.g., TX1 to TX4) having a normal waveform to driving lines (e.g., TL1 to TL4) of the valid display area VDA, and do not supply driving signals (e.g., TX5 and TX6) to driving lines (e.g., TL5 and TL6) of the hidden display area HDA. Accordingly, touch detection of the hidden display area HDA may be inactivated.

The partial driving controller 100 may include a hardware circuit and/or a software algorithm, configured to generate and control the driving signals TX. Also, the partial driving controller 100 may include a hardware circuit and/or a software algorithm, configured to generate a control signal CLT.

The partial driving controller 100 may provide the control signal CLT to the touch processor 200, based on the panel deformation signal PDFS. The control signal CLT may control signal processing of the touch processor 200 on the sensing signals RX. As shown in FIG. 5, normal driving signals TX may be supplied to the hidden display area HDA. Sensing signals (e.g., RX5 and RX6) with respect to the hidden display area HDA may be generated. The partial driving controller 100 may generate the control signal CLT for blocking signal processing on the sensing signals (e.g., RX5 and RX6) of the hidden display area HDA.

The touch processor 200 may receive the sensing signals RX. The touch processor 200 may detect a touch through signal processing on the sensing signals RX. For example, the touch processor 200 may generate touch data TID including touch position information through digital processing on the sensing signals RX, capacitance variation calculation, etc.

In an embodiment, the touch processor 200 may suspend signal processing on at least some of the sensing signals RX, which correspond to the hidden display area HDA.

Figure 10:
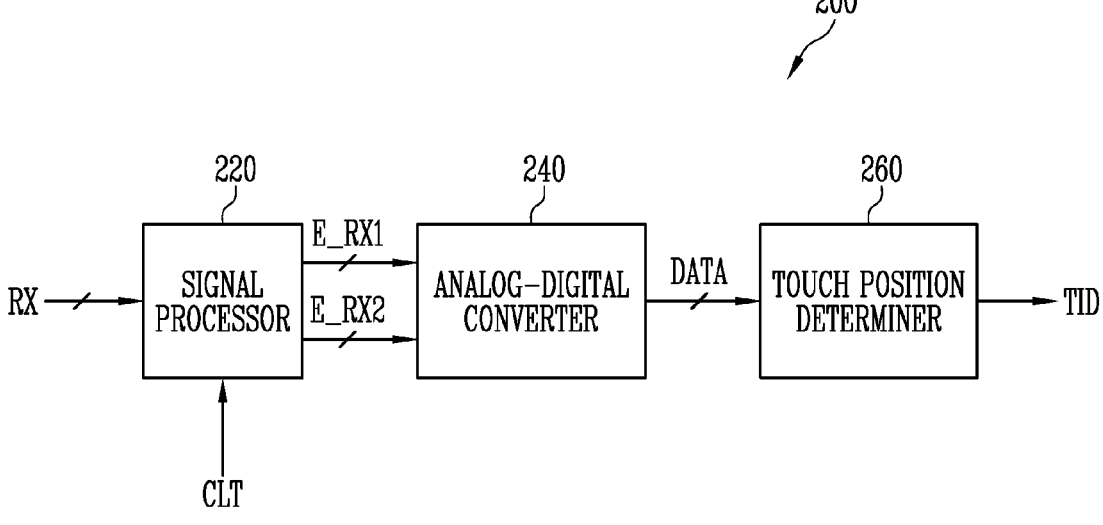
FIG. 10 is a block diagram illustrating an example of a touch processor included in the touch driver shown in FIG. 9.
Figure 11:
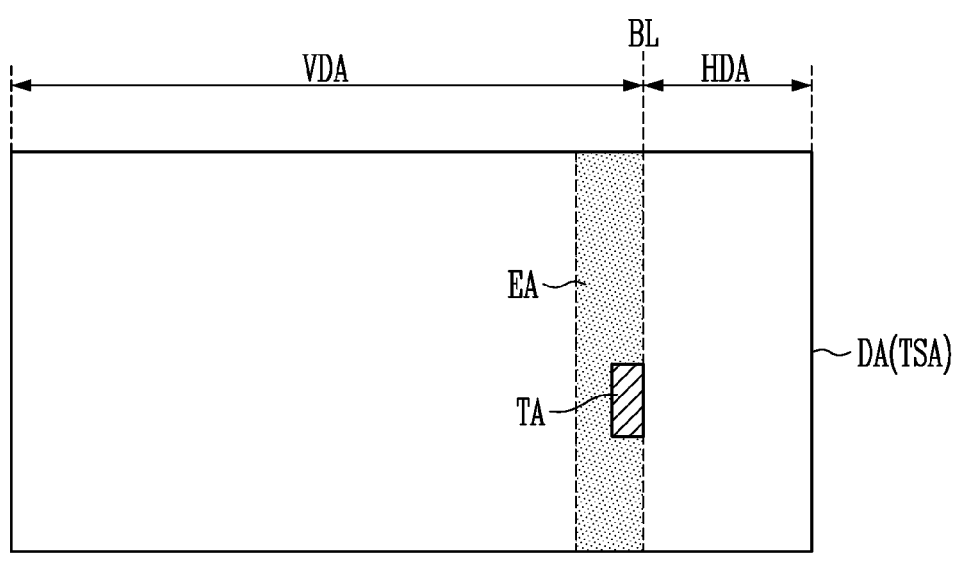
FIG. 11 is a view illustrating an example of an operation of the touch driver shown in FIG. 9, which includes the touch processor shown in FIG. 10.
Figure 12:
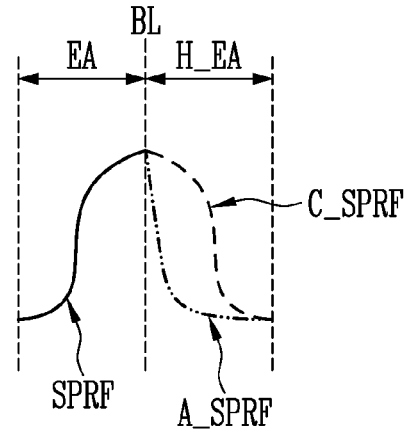
FIG. 12 is a view illustrating an example of a profile of a sensing signal with respect to a touch of an edge area shown in FIG. 10.

FIG. 10 is a block diagram illustrating an example of the touch processor included in the touch driver shown in FIG. 9. FIG. 11 is a view illustrating an example of an operation of the touch driver shown in FIG. 9, which includes the touch processor shown in FIG. 10. FIG. 12 is a view illustrating an example of a profile of a sensing signal with respect to a touch of an edge area shown in FIG. 10.

Referring to FIGS. 10, 11, and 12, the touch processor 200 may include a signal processor 220 and a touch position determiner 260. The touch processor 200 may further include an analog-digital converter 240.

A portion at which an actual touch is made in the touch sensing part TSA has a capacitance change greater than that of another portion. For example, a capacitance variation has a tendency that the capacitance variation is largest at an actually touched portion and decreases as the distance from the actually touched portion increases. The touch processor 200 may determine a touch position, based on a difference in the capacitance variation (e.g., a difference in sensing value). For example, the touch processor 200 may determine a touch position by using a center of gravity method for a distribution of sensing values. That is, a coordinate corresponding to a center of gravity (or an area in which the largest sensing value is represented) may be determined as the touch position.

In addition, touch detection on the hidden display area HAD may be inactivated so as to reduce power consumption of the touch detection.

However, as shown in FIG. 11, when an actually touched area (hereinafter, referred to as a touch area TA) is formed in an edge area EA as a boundary between the valid display area VDA and the hidden display area HDA, sensing values with respect to the right of the touch area TA (e.g., the hidden display area HDA) are not output. Therefore, reference data utilized to obtain a center of gravity of the touch area TA includes sensing data of the edge area EA without sensing data of the hidden display area HDA. That is, reference data of the hidden display area HDA is small or does not exist, and hence the center of gravity of the touch area TA may be calculated as a result that the center of gravity of the touch area TA is further biased toward the valid display area VDA than the actually touched area.

In the display device DD and the touch processor 200 in accordance with embodiments of the present disclosure, distortion of touch position detection of the edge area EA can be reduced through simple signal processing without any separate correction algorithm for correcting the distortion of touch position detection or any additional offset application.

In an embodiment, the signal processor 220 may generate second edge sensing signals E_RX2 by copying first edge sensing signals E_RX1 corresponding to the edge area EA of the valid display area VDA. For example, the signal processor 220 may select the first edge sensing signals E_RX1 and copy the first edge sensing signals E_RX1, based on the control signal CLT. The first edge sensing signals E_RX1 may be some sensing signals corresponding to the edge area EA shown in FIG. 11 among the sensing signals RX.

A profile SPRF of the first edge sensing signals E_RX1 with respect to the touch area TA included in a portion of the edge area EA may be derived as shown in FIG. 12. For example, the magnitude of a sensing value of the first error sensing signals E_RX1 may become smaller as becoming closer to the valid display area VDA from the touch area TA.

The hidden display area HDA is in a state in which the touch detection driving of the hidden display area HDA is inactivated, and any touch cannot be made in the hidden display area HDA. Therefore, an actual signal profile A_SPRF in a hidden edge area H_EA symmetrical to the edge area EA with respect to a boundary line BL between the edge area EA and the hidden display are HDA may not be formed or may have a shape shown in FIG. 12.

To perform the most accurate detection of the touch area TA formed in the edge area EA, a profile of sensing signals may have a Gaussian distribution with respect to the actually touch portion (e.g., the touch area TA). Therefore, the signal processor 220 may generate the second edge sensing signals E_RX2 obtained by copying the first edge sensing signals E_RX to have a compensation profile C_SPRF having a shape symmetrical to the profile SPRF of the first edge sensing signals E_RX1. The profile SPRF of the first edge sensing signals E_RX1 and the compensation profile C_SPRF may be substantially symmetrical to each other with respect to the boundary line BL.

In an embodiment, the signal processor 220 may include an analog circuit such as, for example, a current mirror for copying an analog signal. For example, in the touch sensing part shown in FIG. 5, the signal processor 220 may use, like the fifth sensing signal RX5, a signal obtained by copying the fourth sensing signal RX4, and use, like the sixth sensing signal RX6, a signal obtained by copying the third sensing signal RX3.

However, this is merely illustrative, and the configuration of the signal processor 220 which copies the first edge sensing signals E_RX1 is not limited thereto.

For example, in an embodiment, the analog-digital converter 240 may convert the received sensing signals RX into digital sensing data DATA. For example, the analog-digital converter 240 may convert sensing signals of the valid display area VDA including the first edge sensing signals E_RX1 and the second edge sensing signals E_RX2 into digital sensing data DATA.

The touch position determiner 260 may calculate a center of gravity of the touch area TA formed in the edge area EA, based on the digital sensing data DATA obtained by converting the first edge sensing signals E_RX1 and the second edge sensing signals E_RX2. The touch position determiner 260 may determine a touch position by using the center of gravity, and output touch data TID including information of the touch position.

A profile (e.g., SPRF and C_SPRF) caused by the first edge sensing signals E_RX1 and the second edge sensing signals E_RX2 has a shape similar to the Gaussian distribution, and therefore, the derived touch position may correspond to the touch area TA.

As described above, the display device DD in accordance with embodiments of the present disclosure may inactivate touch detection on the hidden display area HDA which is changed, which may reduce power consumption. Further, the display device DD includes the touch processor 200 which detects a touch of the edge area EA by copying the first edge sensing signals E_RX1 of the edge area EA adjacent to the hidden display area HDA such that the profile of the first edge sensing signals E_RX1 is symmetrical to the compensation profile with respect to the boundary line BL. Thus, the accuracy of detection of a touch position formed in the edge area EA can be improved without creating any additional power consumption for touch position offset application, etc.

Figure 13:
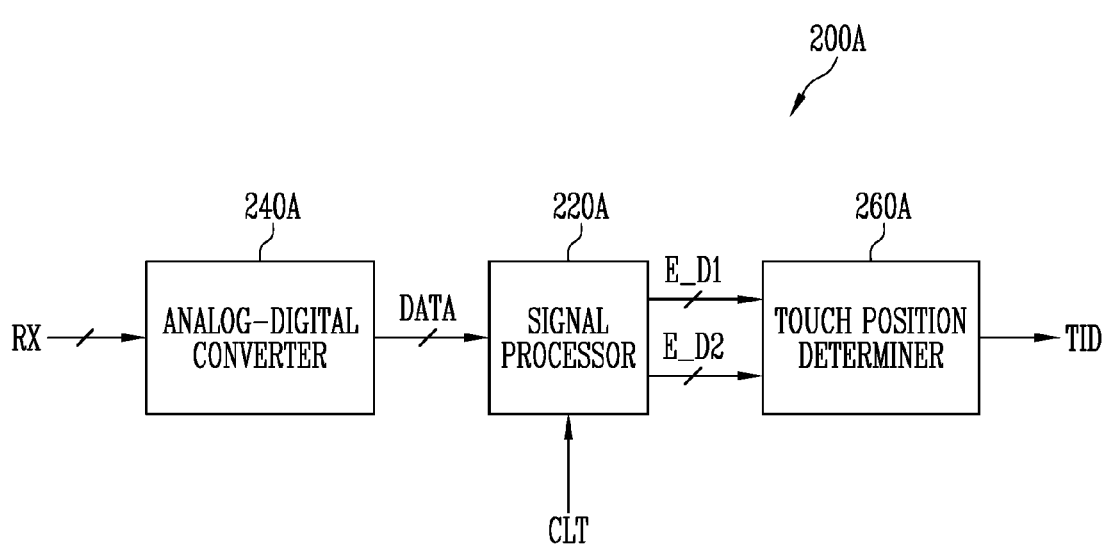
FIG. 13 is a block diagram illustrating an example of the touch processor included in the touch driver shown in FIG. 9.

FIG. 13 is a block diagram illustrating an example of the touch processor included in the touch driver shown in FIG. 9.

In FIG. 13, components identical to those described with reference to FIG. 10 are designated by like reference numerals, and a repetitive description thereof will be omitted. In addition, a touch processor 200A shown in FIG. 13 may be configured substantially identically or similarly to the touch processor 200 shown in FIG. 10, except a processing order of sensing signals RX.

Referring to FIGS. 9, 11, 12, and 13, the touch processor 200A may include a signal processor 220A and a touch position determiner 260A. The touch processor 200A may further include an analog-digital converter 240A.

In an embodiment, the analog-digital converter 240A may convert all sensing signals RX provided through sensing lines into digital sensing data DATA. For example, both the fifth and sixth sensing signals RX5 and RX6 shown in FIG. 5 or all of the first to third sensing signals RX1 to RX3 shown in FIG. 6 may be converted into digital sensing data DATA.

The analog-digital converter 240A may provide the digital sensing data DATA to the signal processor 220A.

The signal processor 220A may perform signal processing on the digital sensing data DATA. In an embodiment, the signal processor 220A may select first edge sensing data E_D1 corresponding to the first edge sensing signals E_RX1 among the digital sensing data DATA, based on the control signal CLT provided from the partial driving controller 100. The signal processor 220A may generate second edge sensing data E_D2 by copying the first edge sensing data E_D1. For example, the second edge sensing data E_D2 may correspond to the second edge sensing signals E_RX2 described with reference to FIGS. 10 to 12.

A profile of the first edge sensing signals E_RX1 may be derived from the first edge sensing data E_D1. In addition, a compensation profile C_SPRF may be derived from the second edge sensing data E_D1. That is, in an embodiment according to FIG. 13, a Gaussian distribution of sensing values may be generated by using the signal processing of the digital sensing data.

The touch position determiner 260A may calculate a center of gravity of the touch area TA formed in the edge area EA, based on the first edge sensing data E_D1 and the second edge sensing data E_D2. The touch position determiner 260 may determine a touch position by using the center of gravity, and output touch data TID including information of the touch position.

As described above, the touch processor 200A may accurately detect the touch area TA by copying and using sensing data (e.g., the first edge sensing data E_D1) of the edge area EA.

Figure 14:
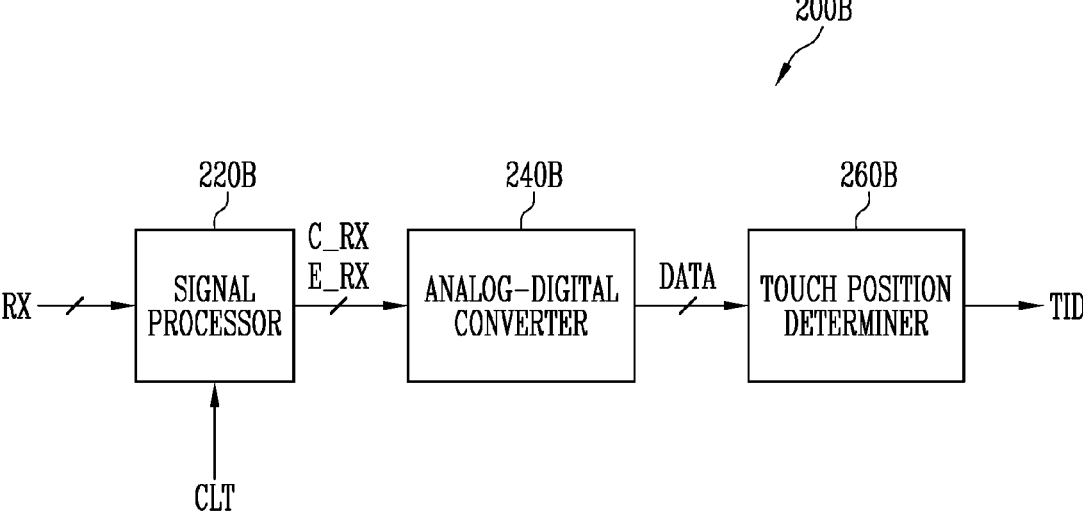
FIG. 14 is a block diagram illustrating an example of the touch processor included in the touch driver shown in FIG. 9.
Figure 15:
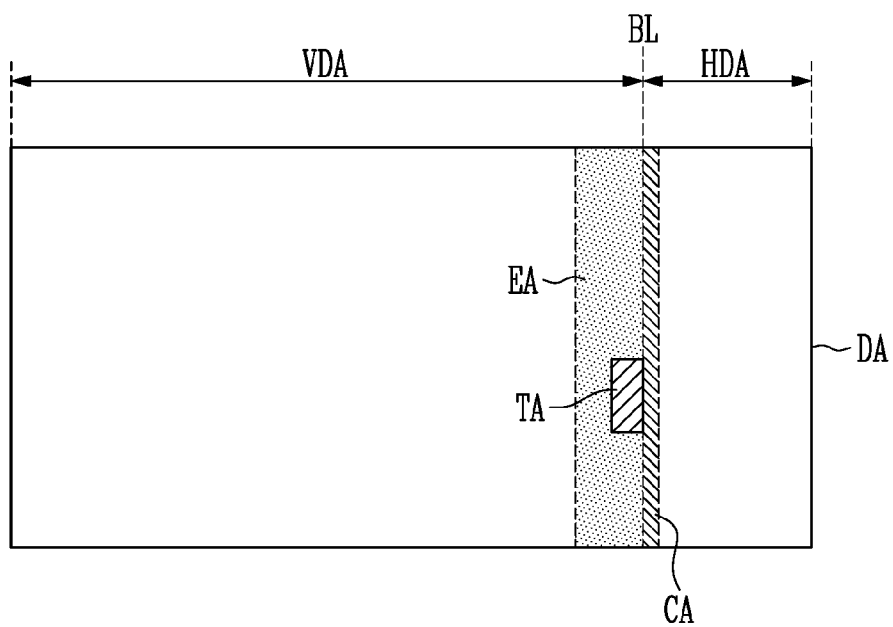
FIG. 15 is a view illustrating an example of an operation of the touch driver shown in FIG. 9, which includes the touch processor shown in FIG. 14.

FIG. 14 is a block diagram illustrating an example of the touch processor included in the touch driver shown in FIG. 9. FIG. 15 is a view illustrating an example of an operation of the touch driver shown in FIG. 9, which includes the touch processor shown in FIG. 14.

Referring to FIGS. 5, 6, 9, 14, and 15, a touch processor 200B may include a signal processor 220B and a touch position determiner 260B. The touch processor 200B may further include an analog-digital converter 240B.

In an embodiment, the partial driving controller 100 may activate touch detection of a compensation area CA as one area of the hidden display area HDA, based on the panel deformation signal PDFS, and inactivate touch detection of the hidden display area HDA except the compensation area CA. Also, the partial driving controller 100 may generate a control signal CLT for controlling the signal processor 220B, based on the panel deformation signal PDFS.

The compensation area CA may be an area adjacent to the boundary line BL. In an embodiment, the compensation area CA may be an area corresponding to a channel of one of the first sensing electrodes SSE1 included in the hidden display area HDA or an area corresponding to a channel of one of the second sensing electrodes SSE2 included in the hidden display area HDA. For example, in FIG. 5, the compensation area CA may be an area in which a capacitance is generate by the second sensing electrodes SSE2 connected to the fifth sensing line RX5. In FIG. 6, the compensation area CA may be an area in which a capacitance is generated by the second sensing electrodes SSE2 connected to the fifth driving line TL5.

The position of the compensation area CA may be changed according to the size and position of the hidden display area HDA.

The signal processor 220B may receive sensing signals RX. In an embodiment, the signal processor 220B may block digital conversion or signal processing on sensing signals corresponding to a portion of the hidden display area HDA except the compensation area CA, based on the control signal CLT (e.g., the panel deformation signal PDFS). For example, as shown in FIG. 6, digital conversion or signal processing on signals corresponding to a portion of the hidden display area in the first sensing signal RX1 may be blocked/suspended. For example, the signal processor 220B may control driving of the analog-digital converter 240B or the touch position determiner 260B.

The signal processor 220B may provide the analog-digital converter 240B with sensing signals RX of the valid display area VDA including edge sensing signals E_RX and compensation sensing signals C_RX corresponding to the compensation area CA.

The analog-digital converter 240B may convert the sensing signals RX of the valid display area VDA including the edge sensing signals E_RX and the compensation sensing signals C_RX into digital sensing data DATA. The digital sensing data DATA may be provided to the touch position determiner 260B.

The touch position determiner 260B may determine a touch position by calculating a center of gravity of a touch area TA (e.g., an actually touched area), based on the digital sensing data DATA. As shown in FIG. 15, when the touch area TA is formed while overlapping the edge area EA, the touch position determiner 260B may calculate a center of gravity of the touch area TA by using digital sensing data DATA of the touch area TA and digital sensing data DATA corresponding to the compensation area CA of the hidden display area HDA.

For example, touch detection of the compensation area CA may be activated, and sensing values may be output. Therefore, a profile of the digital sensing data DATA of the edge area EA and the compensation area CA may have a shape similar to the Gaussian distribution as shown in FIG. 12. Thus, distortion of the calculation of the center of gravity of the touch area TA can be reduced or minimized.

The touch position determiner 260B may output touch data TID including information on the touch position of the touch area TA.

As described above, the touch driver 10 activates only touch driving of a portion of the hidden display area HDA adjacent to the boundary line BL, so that the accuracy of touch position detection of the edge area EA may be improved without causing any increase in power consumption.

FIG. 16 is a flowchart illustrating a method of driving a display device in accordance with embodiments of the present disclosure.

Referring to FIG. 16, a method of driving a display device according to an embodiment may include sensing extension or reduction of a valid display area of a flexible display panel (S100), inactivating touch detection of a hidden display area of the flexible display panel, based on a panel deformation signal indicating the hidden display area (S200), generating second edge sensing signals symmetrical to a profile of first edge sensing signals by copying the first edge sensing signals corresponding to a profile of the valid display area (S300), and determining a touch position of an actually touched area in an edge area, based on the first edge sensing signals and the second edge sensing signals (S400).

In an embodiment, a voltage level of the panel deformation signal may be changed corresponding to a change in size of the hidden display area due to deformation of the flexible display panel. Therefore, an area in which touch detection is inactivated may be determined according to the voltage level of the panel deformation signal.

In an embodiment, in the inactivating of the touch detection of the hidden display area of the flexible display panel S200, supply of driving signals corresponding to the hidden display area may be suspended. In an embodiment, in the inactivating of the touch detection of the hidden display area of the flexible display panel S200, signal processing on sensing signals corresponding to the hidden display area may be suspended.

The second edge sensing signals may be generated by copying the first edge sensing signals S300. In an embodiment, the second edge sensing signals may be generated by copying the first edge sensing signals as an analog signal. Alternatively, in an embodiment, digital data corresponding to the second edge sensing signals may be generated by copying digital data of the first edge sensing signals.

Sensing data associated with a touch area overlapping the edge area due to the first edge sensing signals and the second edge sensing signals may have a Gaussian distribution. A touch position may be determined by using a centroid method for the sensing data having the Gaussian distribution.

As described above, in the display device and a method of driving the same in accordance with embodiments of the present disclosure, touch detection on the hidden display area is inactivated, which may reduce power consumption. Further, the first edge sensing signals of the edge area are copied such that the profile of the first edge sensing signals is symmetrical to the compensation profile with respect to the boundary line, or touch detection of the compensation area as a portion of the hidden display area is activated. Thus, the accuracy of detection of a touch position formed in the edge area can be improved without causing any additional power consumption for touch position offset application, etc.

As is traditional in the field of the present disclosure, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

While the present disclosure has been particularly shown and described with reference to example embodiments thereof, it will be understood by those of ordinary skill in the art that various changes in form and detail may be made therein without departing from the spirit and scope of the present disclosure as defined by the following claims.

What is claimed is:

1. A display device, comprising:
a flexible display panel in which a valid display area viewable to a user is extended or reduced;
a touch sensing part overlapping the flexible display panel, and including first sensing electrodes and second sensing electrodes intersecting the first sensing electrodes;
a touch driver configured to provide driving signals to the first sensing electrodes, and detect a touch by using sensing signals supplied from the second sensing electrodes; and
a display driver configured to drive the flexible display panel such that an image is displayed in the valid display area,
wherein the touch driver is configured to:
inactivate touch detection of at least a portion of a hidden display area of the flexible display panel, based on a panel deformation signal generated by the touch driver indicating a hidden display area;
generate a profile of first edge sensing signals with respect to an actually touched area in an edge area of the valid display area;
generate a compensation profile of second edge sensing signals symmetrical to the profile of the first edge sensing signals with respect to a boundary line separating the valid display area and the hidden display area by copying the first edge sensing signals; and
determine a touch position of the actually touched area in the edge area, based on the profile of the first edge sensing signals and the compensation profile of the second edge sensing signals.

2. The display device of claim 1, wherein the touch driver comprises:

a touch processor configured to detect the touch through signal processing on the sensing signals; and
a partial driving controller configured to suspend supply of hidden driving signals or control driving of the touch processor with respect to hidden sensing signals, based on a panel deformation signal indicating the hidden display area.

3. The display device of claim 2, wherein the hidden driving signals are supplied as a constant voltage.

4. The display device of claim 2, wherein supply of the hidden sensing signals is suspended by a suspension of the supply of the hidden driving signals.

5. The display device of claim 2, wherein the partial driving controller activates touch detection of a compensation area as a portion of the hidden display area adjacent to the edge area, and inactivates touch detection of another area of the hidden display area.

6. The display device of claim 5, wherein the touch processor comprises:
an analog-digital converter configured to convert the sensing signals of the valid display area and the hidden sensing signals of the compensation area into digital sensing data; and
a touch position determiner configured to determine a touch position by calculating a center of gravity of a touched area, based on the digital sensing data.

7. The display device of claim 6, wherein the touch processor further comprises:
a signal processor configured to block digital conversion or signal processing on the hidden sensing signals corresponding to the another area of the hidden display area, based on the panel deformation signal.

8. The display device of claim 7, wherein, when the touched area overlaps the edge area, a profile of the digital sensing data corresponding to the edge area and the compensation area has a shape similar to a Gaussian distribution.

9. The display device of claim 7, wherein the compensation area is an area corresponding to a channel for the first sensing electrodes or an area corresponding to a channel for the second sensing electrodes.

10. The display device of claim 2, wherein a voltage level of the panel deformation signal is changed corresponding to a change in size of the hidden display area due to deformation of the flexible display panel.

11. The display device of claim 10, wherein the display driver includes an output pin outputting the panel deformation signal, and
wherein the touch driver includes an input pin receiving the panel deformation signal from the display driver.

12. The display device of claim 10, wherein the touch driver receives a command corresponding to the panel deformation signal through an interface with an external host, and changes the voltage level of the panel deformation signal, based on the command.

13. The display device of claim 1 wherein the edge area is adjacent to the hidden display area.

14. The display device of claim 1, wherein the touch sensing part is deformed according to deformation of the flexible display panel.

15. A method of driving a display device, the method comprising:
sensing extension or reduction of a valid display area of a flexible display panel;
inactivating touch detection of at least a portion of a hidden display area of the flexible display panel, based on a panel deformation signal indicating the hidden display area;

generating a profile of first edge sensing signals with respect to an actually touched area in an edge area of the valid display area;

generating a compensation profile of second edge sensing signals symmetrical to the profile of the first edge sensing signals with respect to a boundary line separating the valid display area and the hidden display area by copying the first edge sensing signals; and determining a touch position of the actually touched area in the edge area, based on the profile of the first edge sensing signals and the compensation profile of the second edge sensing signals.

16. The method of claim 15, wherein, when inactivating the touch detection of the at least a portion of the hidden display area, supply of driving signals corresponding to the hidden display area is suspended.

17. The method of claim 15, wherein, when inactivating the touch detection of the at least a portion of the hidden display area, signal processing on sensing signals corresponding to the hidden display area is suspended.

18. The method of claim 15, wherein a voltage level of the panel deformation signal is changed corresponding to a change in size of the hidden display area due to deformation of the flexible display panel.

* * * * *